United States Patent [19]

Feder et al.

[11] Patent Number: 5,356,980
[45] Date of Patent: Oct. 18, 1994

[54] AQUEOUS SILICONE DISPERSIONS CROSSLINKABLE INTO FLAME-RESISTANT ELASTOMERIC STATE

[75] Inventors: Michel Feder, Illfurth; Claude Laurent, Seynod, both of France

[73] Assignee: Rhone-Poulenc Chimie, Courbevoie Cedex, France

[21] Appl. No.: 2,547

[22] Filed: Jan. 11, 1993

Related U.S. Application Data

[63] Continuation of Ser. No. 666,378, Mar. 8, 1991, abandoned.

[30] Foreign Application Priority Data

Mar. 8, 1990 [FR] France .................. 90 03221

[51] Int. Cl.$^5$ .................... C08J 5/10; C08K 3/38; C08L 83/04
[52] U.S. Cl. .................... 524/405; 524/404; 524/434
[58] Field of Search .............. 524/404, 405, 434

[56] References Cited

U.S. PATENT DOCUMENTS

| | | | |
|---|---|---|---|
| 4,663,226 | 5/1987 | Vajs et al. | 428/305.5 |
| 4,863,985 | 9/1989 | Pouchol et al. | 524/437 |
| 5,004,771 | 4/1991 | Feder et al. | 524/161 |

FOREIGN PATENT DOCUMENTS

| | | |
|---|---|---|
| 0134912 | 3/1985 | European Pat. Off. |
| 0230831 | 8/1987 | European Pat. Off. |
| 0317447 | 5/1989 | European Pat. Off. |
| 0332544 | 9/1989 | European Pat. Off. |
| 0347309 | 12/1989 | European Pat. Off. |

*Primary Examiner*—Paul R. Michl
*Assistant Examiner*—U. K. Rajguru
*Attorney, Agent, or Firm*—Burns, Doane, Swecker & Mathis

[57] ABSTRACT

Aqueous silicone dispersions having a solids content of at least 40% by weight and crosslinkable into flameproofed elastomeric state by elimination of water therefrom, well adopted, e.g., as jointing material for the construction industry, comprise an oil-in-water emulsion (A) of an α,ω-(dihydroxy)polydiorganosiloxane stabilized by an anionic and/or nonionic surfactant, an effective amount of a crosslinking agent (B), a non-siliceous inorganic filler material ($C_1$), borax hydrate powder ($C_2$), optionally, a non-siliceous hydrated inorganic filler material ($C_3$) and, also optionally, a metal curing catalyst (D).

13 Claims, No Drawings

AQUEOUS SILICONE DISPERSIONS CROSSLINKABLE INTO FLAME-RESISTANT ELASTOMERIC STATE

This application is a continuation of application Ser. No. 07/666,378, filed Mar. 8, 1991, now abandoned.

BACKGROUND OF THE INVENTION

1. Field of the Invention

The present invention relates to novel aqueous dispersions based on silicones that are crosslinkable into flame-resistant elastomeric state by elimination of water therefrom.

2. Description of the Prior Art

Aqueous silicone dispersions that are crosslinkable into elastomeric state by elimination of water therefrom are known to this art; these comprise:
(a) an emulsion (A), of the oil-in-water type, of an $\alpha,\omega$-(dihydroxy)polydiorganosiloxane stabilized by an anionic and/or nonionic surfactant;
(b) a crosslinking agent;
(c) a non-siliceous inorganic filler material; and
(d) a hardening or curing catalyst.

The base emulsion comprises a silicone oil having silanol endgroups, which is generally emulsion-polymerized as described in U.S. Pat. Nos. 2,891,920, 3,294,725 and 3,360,491, namely, using an anionic surfactant which, preferably, also serves as a polymerization catalyst.

In this type of aqueous dispersion, a wide variety of crosslinking agents therefor are also known to this art, with the following being representative:
(i) a microemulsion of silsesquioxane resin (U.S. Pat. No. 3,355,406);
(ii) a siliconate (EP-A-266,729 and EP-A-332,544 and Application EP 89/4,203,785, filed Oct. 9, 1989 and assigned to the assignee hereof);
(iii) a reactive silicone resin of low molecular weight containing alkoxy or acyloxy groups (U.S. Pat. No. 4,554,187);
(iv) a silicone resin of high molecular weight, insoluble in toluene (EP-A-304,719);
(v) a polyalkoxysilane, a polysilicate, a polyacyloxysilane or a polyketiminoxysilane (U.S. Pat. Nos. 3,294,725, 4,584,341, 4,618,642 and 4,608,412);
(vi) a polyamino (or amido)silane (Application FR-A-89/01,654, filed Feb. 3, 1989 and assigned to the assignee hereof);
(vii) a polyalkenoxysilane (Application FR-A-88/13,618, filed Oct. 11, 1988 and assigned to the assignee hereof); and
(viii) a hydroxylated silicone resin containing, per molecule, at least two siloxy units selected from among those of the formulae: $R_3SiO_{0.5}$ (M), $R_2SiO$ (D), $RSiO_{9.5}$ (T) and $SiO_2$ (Q) (French Application FR-A-88/11,609, filed Aug. 31, 1988, and also assigned to the assignee hereof).

These known aqueous dispersions are typically catalyzed by a catalytic hardening compound which is, preferably, a tin salt or a combination of a tin salt and boric acid (FR-A-2,621,921).

Such aqueous dispersions are stable in storage for at least one year when they are sealedly packaged as a single component, in particular in a cartridge. They are extrudable and in this case are either flowing or non-flowing.

Pasty silicone elastomer compositions packaged in two components, where appropriate crosslinking in the form of a foam in the presence of platinum and having a high flame-resistance, are also known to this art (U.S. Pat. No. 4,433,069).

These elastomer compositions, which are not packaged in the form of aqueous dispersions, are effective, but present the disadvantage of being expensive and difficult to use.

EP-A-230,831 describes a flameproofing agent other than platinum for the same type of compositions. According to this '831 patent, at least 3.5 parts by volume of a flameproofing agent comprising a mixture of borax decahydrate, aluminum hydroxide and silica is added to one part by volume of the silicone elastomer composition, the minimum amount of silica being at least two parts by volume.

FR-A-2,632,866 describes the addition of a mixture of treated $TiO_2$, borax and vermiculite to a silicone elastomer.

Flameproofing agents have also been proposed to this art for aqueous dispersions of silicone oils crosslinkable into an elastomer by elimination of water; FR-A-2,621,921 thus describes the use of aluminum hydroxide.

EP-A-332,544 describes the concomitant use of aluminum hydroxide and expanded or non-expanded vermiculite.

EP-A-212,827 describes the concomitant use of expanded vermiculite and fibers selected from ceramic fibers and aramide fibers.

The major disadvantage presented by the elastomers which are the subject of these latter three patents, is that, after they have been exposed to an open flame, the burned elastomers no longer have any mechanical properties because they have become a friable solid without any cohesion.

SUMMARY OF THE INVENTION

Accordingly, a major object of the present invention is the provision of novel aqueous dispersions based on silicone oils crosslinkable, by elimination of water, into flame-resistant elastomeric state, such elastomer nonetheless remaining a solid having a high cohesion and mechanical properties after being burned.

Another object of the present invention is the provision of aqueous dispersions of the above type which can be non-flowing without, however, comprising such synthetic siliceous fillers as pyrogenous silicas and precipitated silicas. Indeed, it has now been found that such fillers, on the one hand, may adversely affect the stability of the aqueous dispersions on storage and, on the other, may ultimately provide elastomers having too high a Young's modulus.

Another object of the present invention is the provision of dispersions of the above type and corresponding elastomers produced therefrom exhibiting all of the following properties:
(a) a stability on storage for at least 6 months and preferably at least one year;
(b) a satisfactory adherence to very diverse supports, stone, concrete, mortar, metals, steel, aluminum, fibrocement, enamels, ceramics, etc.;
(c) a viscosity suitable as to be extrudable from the packaging cartridge and suitably film-forming;
(d) a suitable resistance to abrasion, in particular to moist abrasion, to atmospheric humidity, and to actinic radiation (visible light, U.V.);

(e) a reasonable shrinkage after crosslinking and evaporation of water;

(f) a good permeability to gases and to water vapor;

(g) satisfactory mechanical properties, in particular in respect of modulus of elasticity and tear strength; and (h) a satisfactory water-repellency.

Briefly, the present invention features aqueous dispersions based on silicones that are crosslinkable into flame-resistant elastomeric state by elimination of water therefrom under ambient conditions, comprising:

(A) 100 parts by weight of an emulsion, of the oil-in-water type, of an $\alpha,\omega$-(dihydroxy)polydiorganosiloxane, stabilized by at least one surfactant selected from the anionic and nonionic surfactants and mixtures thereof;

(B) an effective amount of at least one crosslinking agent;

($C_1$) 5 to 100 parts by weight, preferably 20 to 80, of a non-siliceous inorganic filler;

($C_2$) 5 to 100 parts by weight of borax hydrate powder; and (D) optionally, 0.01 to 3 parts by weight of a catalytic hardening metal compound, said dispersion having a solids content of at least 40% by weight.

DETAILED DESCRIPTION OF THE PREFERRED EMBODIMENTS OF THE INVENTION

More particularly according to the present invention, in a preferred embodiment thereof, the dispersions also comprise from 5 to 200, preferably from 50 to 150, parts by weight of a non-siliceous hydrated inorganic filler ($C_3$).

EMULSION (A)

The $\alpha,\omega$-(dihydroxy)polydiorganosiloxanes must have a viscosity of at least 100 mPa.s at 25° C. and preferably of at least 50,000 mPa.s.

Indeed, it is with viscosities higher than 50,000 mPa.s that an elastomer is obtained which has a spectrum of suitable mechanical properties, in particular in respect of the Shore A hardness and elongation.

Moreover, the higher the viscosity, the better the mechanical properties are preserved during aging of the elastomer.

The preferred viscosities according to the present invention range from 50,000 to 1,500,000 mPa.s at 25° C.

The organic radicals of the $\alpha,\omega$-(dihydroxy)polydiorganosiloxanes are monovalent hydrocarbon radicals having up to 6 carbon atoms, which may be substituted by cyano or fluoro substituents. The groups generally used because of their commercial availability are the methyl, ethyl, propyl, phenyl, vinyl and 3,3,3-trifluoropropyl radicals. In general, at least 80% by number of these radicals are methyl radicals.

In a preferred embodiment of the present invention, the $\alpha,\omega$-(dihydroxy)polydiorganosiloxanes prepared by the anionic polymerization process described in U.S. Pat. Nos. 2,891,920 and especially 3,294,725 are used. The polymer obtained is stabilized anionically by a surfactant which, according to U.S. Pat. No. 3,294,725, is preferably the alkali metal salt of an aromatic hydrocarbon-sulfonic acid, the free acid also serving as a polymerization catalyst.

The preferred catalyst and surfactant are dodecylbenzenesulfonic acid and its alkali metal salts, in particular its sodium salt. Other anionic or nonionic surfactants may optionally be added. However, such addition is not necessary because, according to U.S. Pat. No. 3,294,725, the amount of anionic surfactant resulting from the neutralization of the sulfonic acid is sufficient to stabilize the polymer emulsion. This amount is generally less than 3% and preferably 1.5% of the weight of the emulsion.

This emulsion polymerization process is particularly valuable because it enables the emulsion (A) to be obtained directly. Moreover, this process makes it possible to obtain $\alpha,\omega$-(dihydroxy)polydiorganosiloxane emulsions (A) of very high viscosity without difficulty.

In order to prepare the emulsion (A), it is also possible to use, as appropriate starting material, an $\alpha,\omega$-(dihydroxy)polydiorganosiloxane which has already been polymerized and to then convert this into an aqueous emulsion, and stabilizing the emulsion using an anionic and/or nonionic surfactant in accordance with techniques well known to this art and described, for example, in FR-A-2,064,563, FR-A-2,094,322, FR-A-2,114,230 and EP-A-169,098.

According to this process, the $\alpha,\omega$-(dihydroxy)-polydiorganosiloxane polymer is mixed, by simple stirring, with the anionic and nonionic surfactant, it being possible for the latter to be in aqueous solution. Water is then added, if necessary, and the entire mass is converted into a fine and homogeneous emulsion by processing through a conventional colloid mill.

Subsequently, the ground material obtained is diluted with an appropriate amount of water and an emulsion (A) which is stabilized by an anionic or nonionic surfactant and is stable in storage is thus produced.

The amount of anionic and nonionic surfactant which can be used is that commonly used for carrying out the emulsifying process, in particular those amounts described in the above patents and in U.S. Pat. No. 2,891,920.

According to the present invention, the preferred anionic surfactants are the alkali metal salts of an aromatic hydrocarbon-sulfonic acid and the preferred nonionic surfactants are the polyoxyethylenated alkylphenols. These nonionic surfactants are, of course, the same as those which may optionally be added to the emulsions (A) obtained by emulsion polymerization as indicated above.

The emulsion (A) prepared by emulsion polymerization, or by emulsifying the silicone polymer, is in the form of an oil-in-water emulsion and preferably has a solids content of more than 45% by weight.

CROSSLINKING AGENT (B)

This crosslinking agent enables the reticulated elastomer network to be established during crosslinking of the aqueous dispersion, by polycondensation reactions between the reactive groups of the crosslinking agent and the silanol endgroups of the silicone oil in the emulsion (A).

As indicated in the aforesaid patents, numerous different crosslinking agents exist which may be used either alone or in admixture. The amounts of the crosslinking agents to be introduced into the aqueous dispersions depend precisely on the nature of the crosslinking agent used.

By an "effective amount" of (B) is intended an amount which enables an elastomer to be produced.

Exemplary thereof are the following crosslinking agents, as well as the specified amounts thereof in the final dispersion, such amounts being expressed in parts by weight per 100 parts by weight of emulsion (A):

(i) 0.1 to 15 parts, preferably 1 to 10 parts, of an organosiliconate;

(ii) 1 to 100 parts of a microemulsion of silsesquioxane resin according to U.S. Pat. Nos. 3,355,406 and 3,433,780;

(iii) 5 to 100 parts of a reactive silicone resin of low molecular weight containing alkoxy and acyloxy groups, (vi) 5 to 100 parts of silicone resin of high molecular weight which is insoluble in toluene;

(v) 5 to 100 parts of a hydroxylated silicone resin containing, per molecule, at least 2 different structural units selected from among those of the formulae: $R_3SiO_{0.5}$ (M), $R_2SiO$ (D), $RSiO_{1.5}$ (T) and $SiO_2$ (Q), with R principally being a $C_1$–$C_6$ alkyl, vinyl and 3,3,3-trifluoropropyl radical, and a hydroxyl group content by weight of from 0.1% to 10% (among such resins, which are preferably introduced in the form of aqueous emulsions, the resins MQ, MDQ, TD and MTD are particularly exemplary); and (vi) 1 to 20 parts of a silane of the formula:

$$R_aSiX_{4-a}$$

in which R is a monovalent organic radical, in particular methyl or vinyl, a is 1 or 0, and X is a condensable and/or hydrolyzable group selected in particular from among the alkoxy, acyloxy, ketiminoxy, alkylamino, amido and alkenyloxy radicals. In the event that X is alkoxy, it is desirable to add 2-amino-2-methylpropanol as a stabilizer, as per EP-A-259,734.

NON-SILICEOUS INORGANIC FILLER ($C_1$)

Another constituent of the dispersion according to the invention is the addition of 5 to 100, preferably 20 to 80, parts of a non-siliceous inorganic filler.

Non-siliceous filler ($C_1$) thus excludes the fillers consisting of synthetic silicas which are silicas produced by combustion and silicas produced by precipitation.

The fillers ($C_1$) advantageously have a particle size generally ranging from 0.001 to 300 μm and a BET surface area of less than 100 m²/g.

Exemplary fillers ($C_1$) which may be used either alone or in admixture are titanium dioxide, aluminum oxide, non-hydrated micas such as muscovite, sericite and biotite, calcium carbonate, zinc oxide, talc, iron oxide, barium sulfate and slaked lime.

The preferred filler ($C_1$) is calcium carbonate having an average particle diameter of less than 0.1 μm, which also enables a final aqueous dispersion having a more or less pronounced "thixotropic" character to be obtained.

BORAX HYDRATE POWDER ($C_2$)

Another constituent of the dispersion according to the invention is the addition of 10 to 100 parts by weight, preferably 20 to 80 parts by weight, of borax hydrate powder, which is used in the form of a powder having a particle size which may vary, as for the filler ($C_1$), from 0.001 to 300 μm. By "borax hydrate" is intended a borax containing water of crystallization that constitutes part of the molecular structure ($C_2$).

Preferred are the following borax hydrates:

(i) borax decahydrate, also termed disodium tetraborate decahydrate, of the formula:

$$Na_2B_4O_7.10H_2O$$

(ii) borax pentahydrate, also termed disodium tetraborate pentahydrate, of the formula:

$$Na_2B_4O_7.5H_2O$$

(iii) borax tetrahydrate, also termed kernite or Rasorite, namely, disodium tetraborate tetrahydrate, of the formula:

$$Na_2B_4O_7.4H_2O$$

During the action of a flame on the elastomer, these borax hydrates ceramize the combustion products of the elastomer. The burned elastomer thus retains excellent cohesion and is converted into a rigid material retaining adequate mechanical properties.

According to this invention, it is preferred to use borax decahydrate.

NON-SILICEOUS HYDRATED INORGANIC FILLER ($C_3$)

It is not required that a filler ($C_3$) be included in the dispersions of the invention, but incorporation of such filler material is indeed advantageous.

A "non-siliceous inorganic filler ($C_3$)" excludes fillers consisting of synthetic silicas which are silicas produced by combustion and silicas produced by precipitation.

According to this invention by "hydrated inorganic filler ($C_3$)" are intended fillers containing water of crystallization that constitutes part of the molecular structure of ($C_3$).

The preferred filler ($C_3$) is alumina hydrate, typically represented by the formulae $Al_2O_3.3H_2O$ or $Al(OH)_3$.

The following are also exemplary fillers ($C_3$):

(i) a mica hydrate such as expanded or nonexpanded vermiculite, (ii) ammonium aluminum sulfate dodecahydrate:

$$NH_4Al(SO_4)_2.12H_2O,$$

(iii) chromium sulfate pentadecahydrate:

$$Cr_2(SO_4)_3.12H_2O,$$

(iv) sodium sulfate heptahydrate:

$$Na_2SO_4.7H_2O,$$

(v) potassium chromium sulfate decahydrate:

$$Kr_2(SO_4)_2.12H_2O,$$

(vi) tetrasodium pyrophosphate decahydrate:

$$Na_4P_2O_2.10H_2O,$$

(vii) calcium oxide hexahydrate:

$$CaO.8H_2O,$$

(viii) trisodium orthophosphate decahydrate:

$$Na_3PO_4.10H_2O,$$

(ix) zeolite hydrate.

5 to 200 parts by weight, preferably 40 to 150 parts by weight, of filler ($C_3$) are advantageously included.

The aqueous dispersions of this invention may optionally also contain other additives known to improve flame-resistance, such as, for example, ceramic fibers, aramide fibers or mixtures thereof, as described in EP-A-212,827, glass spheres, rare earth oxides, in particular cerium oxide $CeO_2$, zinc borate or platinum.

METAL CURING CATALYST (D)

Compound (D), in particular for certain cross-linking agents (B) such as siliconate, is optional, but its use is nonetheless recommended according to the present invention.

The catalytic hardening metal compounds (D) are essentially the salts of carboxylic acids and halides of such metals as lead, zinc, zirconium, titanium, iron, tin, barium, calcium and manganese.

The constituent (D) is preferably a catalytic compound containing tin, generally an organotin salt, preferably introduced in the form of an aqueous emulsion. The organotin salts which are suitable are described, in particular, in the publication by Noll, *Chemistry and Technology of Silicones*, page 337, Academic Press (1968).

It is also possible to use the product of the reaction of an alkyl silicate or an alkyl trialkoxysilane with dibutyltin diacetate, as described in Belgian Patent BE-A-842,305.P.

The preferred tin salts are the tin bischelates (EP-A-147,323 and EP-A-235,049), diorganotin dicarboxylates and, in particular, dibutyl- or dioctyl-tin diversatates (British Patent GB-A-1,289,900), dibutyl- or dioctyl-tin diacetate or dibutyl- or dioctyl-tin dilaurate. From 0.01 to 3, preferably from 0.05 to 2, parts by weight of organotin salt are used per 100 parts by weight of (A).

The aqueous dispersions according to the invention may also contain the customary additives such as, in particular, antifungal agents, antifoams, antigels such as ethylene glycol and propylene glycol, and thixotropic agents such as carboxymethylcellulose, xanthan gum and polyvinyl alcohol.

In order to formulate the aqueous dispersion according to the invention, it is advantageous to first add the hardening metal catalyst (D), where appropriate, the nonsiliceous inorganic filler ($C_1$), the filler ($C_3$), where appropriate, the crosslinking agent (B) and the filler ($C_2$) to the emulsion (A), at ambient temperature, with stirring.

The pH of the aqueous dispersion may be acid, neutral or alkaline. It is, however, advantageous to adjust the pH of the dispersion to a value ranging from 8 to 13 using a strong organic or inorganic base (triethanolamine, sodium hydroxide, potassium hydroxide).

The resulting final emulsion is homogenized and then degassed and is then sealed in packaging material which does not permit the ingress of atmospheric oxygen and water vapor.

The constituents (A), (B), (C) and (D), ($C_1$), ($C_2$) and ($C_3$) are mixed in amounts such that the final dispersion has a solids content of more than 40% by weight and preferably of more than 60% by weight but generally below 90% by weight.

The dispersions according to the invention may be used as a paint crosslinkable into a thin layer. They then preferably have a solids content ranging from 40% to 70% by weight.

To determine the solids content, 2 g of dispersion are placed in an aluminum weighing dish and the dish is heated for one hour at 150° C. in a circulating air oven.

After cooling, the dish is weighed again and the percentage of the initial 2 g of material remaining is determined, which represents the solids content.

In a preferred embodiment of the invention, the dispersion is subjected, after its preparation, to an aging or ripening step, at ambient temperature, of from a few hours to a few days.

This aging or ripening step simply entails permitting the dispersion to stand in the absence of atmospheric oxygen before its use.

The dispersions according to the invention may be used to produce silicone elastomer joints, in particular for the construction industry and as water-repellant and flame-proofing coatings for building surfaces exposed to outside weather conditions, in an amount of, for example, 20 to 100 g of dispersion per $m^2$ of surface to be coated.

The aqueous dispersions according to the invention may be extruded to provide a flowing or non-flowing gel.

The non-flowing aqueous dispersions are particularly useful when they are used to produce fireproof joints for the construction industry, in naval construction, etc.

These non-flowing compositions are, however, sufficiently fluid as to penetrate into the interior of cavities to be filled, but they are sufficiently viscous not to flow for more than a few millimeters on a vertical surface.

The flowing dispersions are more particularly useful as flame-retardant paints, in particular on glass.

It is known to this art how to produce flowing or non-flowing dispersions.

The non-flowing dispersions have a high solids content (for example higher than 65%) and a high content of filler ($C_1$, i.e., calcium carbonate having an average particle diameter of less than 0.1 μm.

The flowing dispersions have a solids content of, for example, from 40% to 65%.

The aqueous dispersions according to the invention may be packaged in the form of aerosols as described in EP-A-212,827. The elastomers issuing from these aerosols cross-link in the form of a foam having similar flame-resistance properties.

In order to further illustrate the present invention and the advantages thereof, the following specific examples are given, it being understood that same are intended only as illustrative and in nowise limitative.

In said examples to follow, as in the above description, all parts and percentages are given by weight, unless otherwise indicated.

EXAMPLE 1

An emulsion (A) was prepared by polymerizing 1,000 g of an α,ω-(dihydroxy)polydimethylsiloxane oil having a viscosity of 100 mPa.s at 25° C. in the presence of 30 g of dodecylbenzenesulfonic acid and 50 g of Cemulsol ON 10/20, which is a nonionic surfactant, i.e., a polyoxyalkylene compound containing 10 ethylene oxide units and 20 propylene oxide units.

The emulsion polymerization was terminated by neutralizing the catalyst using 14.5 g of triethanolamine when the viscosity of the oil reached 300,000 mPa.s at 25° C.

The emulsion (A) obtained had a solids content of 61% and a pH of 7.

In a 5 liter Meili ® hand-mixer, the various constituents were added in the sequence indicated below and maintaining an incorporation time of about 10 minutes for each addition:

(i) 186 parts of emulsion (A),
(ii) 2.2 parts of aqueous 50% by weight KOH solution,
(iii) 2.6 parts of aqueous 40% by weight dioctyltin dilaurate emulsion,
(iv) 70 parts of $CaCO_3$ produced by precipitation and having a particle size of less than 0.1 μm, marketed under the trademark Winnofil SP ® by ICI,
(v) 200 parts of aluminum hydroxide SH 100 ® marketed by Lambert Riviere,
(vi) 7 parts of silicone resin comprising 70% by weight of $CH_3SiO_{1.5}$ recurring units and 30% by weight of $(CH_3)_2SiO$ recurring units having a viscosity of 5,400 mPa.s at 25° C. and containing 2.2% OH, and
(vii) 50 parts of borax decahydrate marketed by Prolabo.

After the addition of borax, the mixture was homogenized for about 30 minutes under a reduced pressure of 2.5 KPa.

The final dispersion had a solids content of 85% and a pH of 9.

This dispersion was divided into several batches which were stored in leak-tight packaging (cartridges made of plastic material). These cartridges were stored before use for specific periods t (in days) and at specific temperatures Θ (in °C.).

COMPARATIVE EXAMPLE 2

The procedure of Example 1 was repeated exactly, except that the 50 g of borax tetrahydrate were replaced by 50 g of Mica MAS 10 ® marketed by Adriss.

The mechanical properties obtained are reported in Table I below.

Using a doctor blade, the dispersion was spread to provide a coating (film) 2 mm thick which was permitted to dry for 10 days at ambient temperature (20° C.).

The following average mechanical properties were measured on a first batch of dried coatings:
(a) the Shore A hardness (SAH) in accordance with the standard ASTM-D-2240,
(b) tear strength (TS) in accordance with the standard AFNOR-T-46 002 corresponding to the standard ASTMD 412, in MPa, and
(c) the elongation at break (EB) in % in accordance with the standard AFNOR-T 46 002.

The mechanical properties obtained are reported in Table I below.

In order to estimate the adherence, a 4 mm thick strand of aqueous dispersion was applied to a glass or concrete support. After 12 days, the adherence of the elastomer formed was estimated by pulling on the strand by hand.

The adhesion was qualified in three ways:
(1) good adherence, when the strand could not be detached from its support (rating ++),
(2) average adherence, when the strand was difficult to detach and detached over small areas (rating +), and
(3) no adherence, when the strand detached easily (rating 0).

The estimates of the adhesion are reported in Table I below.

EXAMPLE 3

This example illustrates the flame resistance of the elastomer produced from the dispersion described in Example 1.

3 (a). Coatings of elastomer films 2 mm thick prepared for determination of mechanical properties were placed vertically in the horizontal flame of a bunsen burner for 10 minutes, the tip of the blue cone of the flame always being level with the same part of the elastomer surface.

The temperature of the flame was about 960° C.

When the films were withdrawn from the flame, it was found that they were perfectly self-extinguishing and the part of the elastomer surface exposed to the flame retained a good cohesion. Ceramization of the surface in direct contact with the flame was observed.

3 (b). The procedure of Example 3 (a) was repeated exactly, except that:
(i) the thickness of the coating was 8 mm,
(ii) the following were recorded with the aid of 3 thermocouples:
the temperature ΘN of the face surface not exposed to the flame, and
the temperature ΘC in the core of the coating, and
(iii) the time t, in minutes, of exposure to the flame was 20 minutes. The results obtained are reported in Table II below.

3(c). The procedure of Example 3 (b) was repeated exactly, except that the bunsen burner was replaced by an oxygen/acetylene torch having a temperature of 2,400° C. The coating resisted for about 15 minutes, before being burned completely therethrough, despite the simultaneous effect of the delayed combustion and the blast of the torch.

A ceramization of the surface in direct contact with the flame was observed.

TABLE I

| | (days) | θ (°C.) | SAH | TS | EB | ADHERENCE glass | concrete | steel | stainless steel |
|---|---|---|---|---|---|---|---|---|---|
| Example 1 | 1 | 25 | 48 | 0.38 | 62 | ++ | ++ | + | + |
| | 14 | 50 | 61 | — | — | — | — | — | — |
| Example 2 | 1 | 25 | 50 | 0.71 | 61 | ++ | ++ | + | + |
| | 7 | 50 | 56 | 0.87 | 42 | — | — | — | — |
| | 14 | 50 | 60 | — | — | — | — | — | — |

TABLE II

| t | 0 | 1 | 2 | 3 | 4 | 5 | 8 | 10 | 15 | 20 |
|---|---|---|---|---|---|---|---|---|---|---|
| θ E | 20 | 958 | 954 | 962 | 959 | 963 | 955 | 960 | 964 | 960 |
| θ N | 20 | 42 | 55 | 82 | 98 | 106 | 182 | 198 | 223 | 243 |
| θ C | 20 | 55 | 77 | 103 | 142 | 177 | 247 | 261 | 304 | 341 |

While the invention has been described in the terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aqueous silicone dispersion crosslinkable into flame-resistant elastomeric state by elimination of water therefrom, having a solids content of at least 40% by weight, comprising (A) an oil-in-water emulsion of an α,ω-(dihydroxy)polydiorganosiloxane including a stabilizing amount of at least one anionic or nonionic surfactant, or mixture thereof, (B) an effective crosslinking amount of at least one crosslinking agent therefor, ($C_1$) a non-siliceous inorganic filler material, and ($C_2$) a borax hydrate powder in an amount effective to ceramize said dispersion when in cross-linked flame-resistant elastomeric state, said silicone dispersion not including a siliceous filler.

2. The aqueous silicone dispersion as defined by claim 1, further comprising (D) a catalytically effective amount of a metal curing catalyst.

3. The aqueous silicone dispersion as defined by claim 1, further comprising ($C_3$) a non-siliceous hydrated inorganic filler material.

4. The aqueous silicone dispersion as defined by claim 1, comprising 100 parts by weight of said emulsion (A), 5 to 100 parts by weight of said filler ($C_1$) and 10 to 100 parts by weight of said borax hydrate powder ($C_2$).

5. The aqueous silicone dispersion as defined by claim 3, comprising 5 to 200 parts by weight of said filler 3.

6. The aqueous silicone dispersion as defined by claim 5, wherein the amount of ($C_2$) ranges from 10% to 50% by weight of the total amount of ($C_2$) and ($C_3$).

7. The aqueous silicone dispersion as defined by claim 1, said borax hydrate ($C_2$) comprising borax decahydrate, borax pentahydrate or borax tetrahydrate.

8. The aqueous silicone dispersion as defined by claim 3, said filler ($C_3$) comprising aluminum hydroxide.

9. The aqueous silicone dispersion as defined by claim 1, said filler ($C_1$) comprising calcium carbonate having an average particle diameter of less than 0.1 μm.

10. The aqueous silicone dispersion as defined by claim 1, said crosslinking agent (B) comprising an organosiliconate; a silsesquioxane resin; a reactive silicone resin of low molecular weight containing alkoxy and acyloxy groups; a silicone resin of high molecular weight which is insoluble in toluene; a hydroxylated silicate resin containing, per molecule, at least two different units selected from among those of the formulae: $R_3SiO_{0.5}$ (M), $R_2SiO$ (D), $RSiO_{1.5}$ (T) and $SiO_2$ (Q), wherein R comprises a $C_1$–$C_6$ alkyl, vinyl or 3,3,3-trifluoropropyl radical, and having a hydroxyl group content by weight ranging from 0.1% to 10%; or a silane of the formula:

$$R_aSiX_{4-a}$$

in which R is a monovalent organic radical, a is 1 or 0, and X is a condensable and/or hydrolyzable functional group.

11. The aqueous silicone dispersion as defined by claim 2, said metal curing catalyst comprising an organotin compound.

12. A flameproofed silicone elastomer comprising the dispersion as defined by claim 1, in crosslinked dehydrated state.

13. A shaped article comprising the flameproofed silicone elastomer as defined by claim 12.

* * * * *